(12) United States Patent
Akao et al.

(10) Patent No.: US 7,869,039 B2
(45) Date of Patent: Jan. 11, 2011

(54) MICROSCOPIC-MEASUREMENT APPARATUS

(75) Inventors: Kenichi Akao, Hachioji (JP); Jun Koshoubu, Hachioji (JP)

(73) Assignee: JASCO Corporation, Hachioji-shi, Tokyo (JP)

( * ) Notice: Subject to any disclaimer, the term of this patent is extended or adjusted under 35 U.S.C. 154(b) by 198 days.

(21) Appl. No.: 12/255,687

(22) Filed: Oct. 22, 2008

(65) Prior Publication Data
US 2009/0103173 A1 Apr. 23, 2009

(30) Foreign Application Priority Data
Oct. 22, 2007 (JP) .............................. 2007-273967

(51) Int. Cl.
*G01J 4/00* (2006.01)
(52) U.S. Cl. ..................... 356/368; 356/600; 356/601; 715/836; 715/856; 715/849
(58) Field of Classification Search ................. 356/368, 356/600, 601; 715/838, 845, 856, 858, 849, 715/857
See application file for complete search history.

(56) References Cited

U.S. PATENT DOCUMENTS

| | | | |
|---|---|---|---|
| 3,705,755 A | 12/1972 | Baer | |
| 5,192,980 A | 3/1993 | Dixon et al. | |
| 6,141,100 A | 10/2000 | Burka et al. | |
| 7,224,460 B2 | 5/2007 | Soga et al. | |
| 2002/0041439 A1 | 4/2002 | Engelhardt et al. | |
| 2005/0248837 A1 | 11/2005 | Sase et al. | |
| 2006/0164633 A1 | 7/2006 | Koshoubu et al. | |
| 2008/0282197 A1* | 11/2008 | Yumoto et al. ............... 715/838 | |

FOREIGN PATENT DOCUMENTS

| | | |
|---|---|---|
| EP | 1209504 A2 | 5/2002 |
| JP | 2006-208016 | 8/2006 |

OTHER PUBLICATIONS

Japanese Patent Abstract Publication No. 04-348254, Published Dec. 12, 1992, One page.
Commonly owned U.S. Appl. No. 11/337,817, filed Jan. 23, 2006, 22 pages.
European Search Report for EP 08167147 mailed Jan. 22, 2009, three pages.

* cited by examiner

*Primary Examiner*—Gregory J Toatley
*Assistant Examiner*—Iyabo S Alli
(74) *Attorney, Agent, or Firm*—Rankin, Hill & Clark LLP

(57) ABSTRACT

A microscopic-measurement apparatus capable of conducting measurement successively in several set areas regardless of the type of stage driving system or the precision of the stage driving system. The microscopic-measurement apparatus for acquiring optical information from desired portions of a sample by moving a measuring optical axis on a surface of the sample includes an observation-image display section for displaying a sample surface image as an observation image, in a range of visual field which is observable at a present sample position; an optical-axis display section for displaying areas to be measured and a present position of the measuring optical axis in an overlapped state with the observation image; an area setting section capable of setting measuring areas by expanding, reducing, changing in shape and moving the areas to be measured; and an optical-information acquisition section for measuring one set measuring area or several set measuring areas successively with an instruction of starting measurement.

6 Claims, 4 Drawing Sheets

MICROSCOPIC-MEASUREMENT APPARATUS

RELATED APPLICATIONS

This application claims the priority of Japanese Patent Application No. 2007-273967 filed on Oct. 22, 2007, which is incorporated herein by reference.

FIELD OF THE INVENTION

The present invention relates to microscopic-measurement apparatuses, and more specifically, to an improvement of an area setting section for mapping measurement to acquire optical information.

BACKGROUND OF THE INVENTION

Microscopic-measurement apparatuses such as infrared microspectrometers can acquire optical information from a minute portion on the surface of a sample. However, Fourier transform infrared spectrometers require integrated measurement data, even when measuring a single point. Additionally, to acquire optical information from every minute portion of a large measuring area, Fourier transform infrared spectrometers are also required to conduct mapping measurement in a position of a detector relative to the surface of a sample which is successively changed. For example, Japanese Unexamined Patent Publication No. 2006-208016 discloses a method of mapping measurement using an attenuated-total-reflection measurement apparatus, which can automatically conduct mapping measurement in a predetermined area.

As described above, however, when acquiring optical information from a multitude of measuring areas, it takes time to acquire integrated data in each measuring area, and it also takes a certain amount of time to acquire mapping data of a predetermined dimension.

Thus, a method which enables one to set several optical-information acquisition areas in advance, and set such areas at a single time, and then acquire data successively in every set area has been developed.

Generally, a position of a photoreceiver is successively moved relative to a position of a sample in a stepwise fashion during measurement. When several optical-information acquisition areas are set to be measured, it has been common that a stage where the sample is placed is moved according to movements between areas and relative movements within each area.

However, errors owing to movements accumulate as the stage is moved, and it is necessary to position a stage during mapping measurement to exactly the same place during area setting. Thus, an electrically-controlled stage with extremely high precision has been demanded. In addition, a stage is unsuitable for rapid scanning since it is generally heavy so as to maintain itself stable. Thus, it has been sometimes stressful for operators to set area positions with slow stage driving when setting optical-information acquisition areas.

DISCLOSURE OF THE INVENTION

Problem to be Solved by the Invention

The present invention has been conceived in view of the above-described prior art, and objects thereof are to provide a microscopic-measurement apparatus which can set measuring areas rapidly regardless of the type of stage driving system being used or the precision of the stage driving mechanism, and the apparatus can conduct accurate measurements in the set areas.

Means to Solve the Problem

To achieve the above-described purpose, the present invention provides a microscopic-measurement apparatus for acquiring optical information from desired portions by moving a measuring optical axis on a surface of a sample, comprising:

an observation-image display section for displaying a sample surface image as an observation image, in a range of visual field which is observable at a present sample position;

an optical-axis display section for displaying areas to be measured and a present position of the measuring optical axis in an overlapped state with the observation image;

an area setting section for being capable of setting measuring areas by expanding, reducing, changing in shape and moving the areas to be measured; and an optical-information acquisition section for measuring one set measuring area or several set measuring areas successively with an instruction of starting measurement.

It is preferred that the above-mentioned apparatus includes an area memory and a display section for storing information about several set measuring areas, and displaying set measuring areas which can be displayed on the present observation image.

In the above-mentioned apparatus, it is preferred that the areas to be measured are areas to be mapping-measured in which mapping measurement is conducted within the areas, and the set measuring areas are set mapping-measuring areas.

In the above-mentioned apparatus, it is preferred that the observation-image display section has an observation optical system to observe a surface of a sample visually, fixes an observation optical axis of the observation optical system on the surface of the sample, and displays a sample surface image as an observation image in a range of visual field which is observable with the fixed observation optical axis.

The microscopic-measurement apparatus according to the present invention, as described above, sets measuring areas within a range of observable visual field, specifies the measuring areas by moving only a measuring optical axis, and measures optical information in each set measuring area. Thus, the apparatus makes it possible to set measuring areas rapidly and conduct measurement having high accuracy in positioning without relying on the stage drive system or precision of stage driving.

DESCRIPTION OF THE PREFERRED EMBODIMENT

Figure 1:
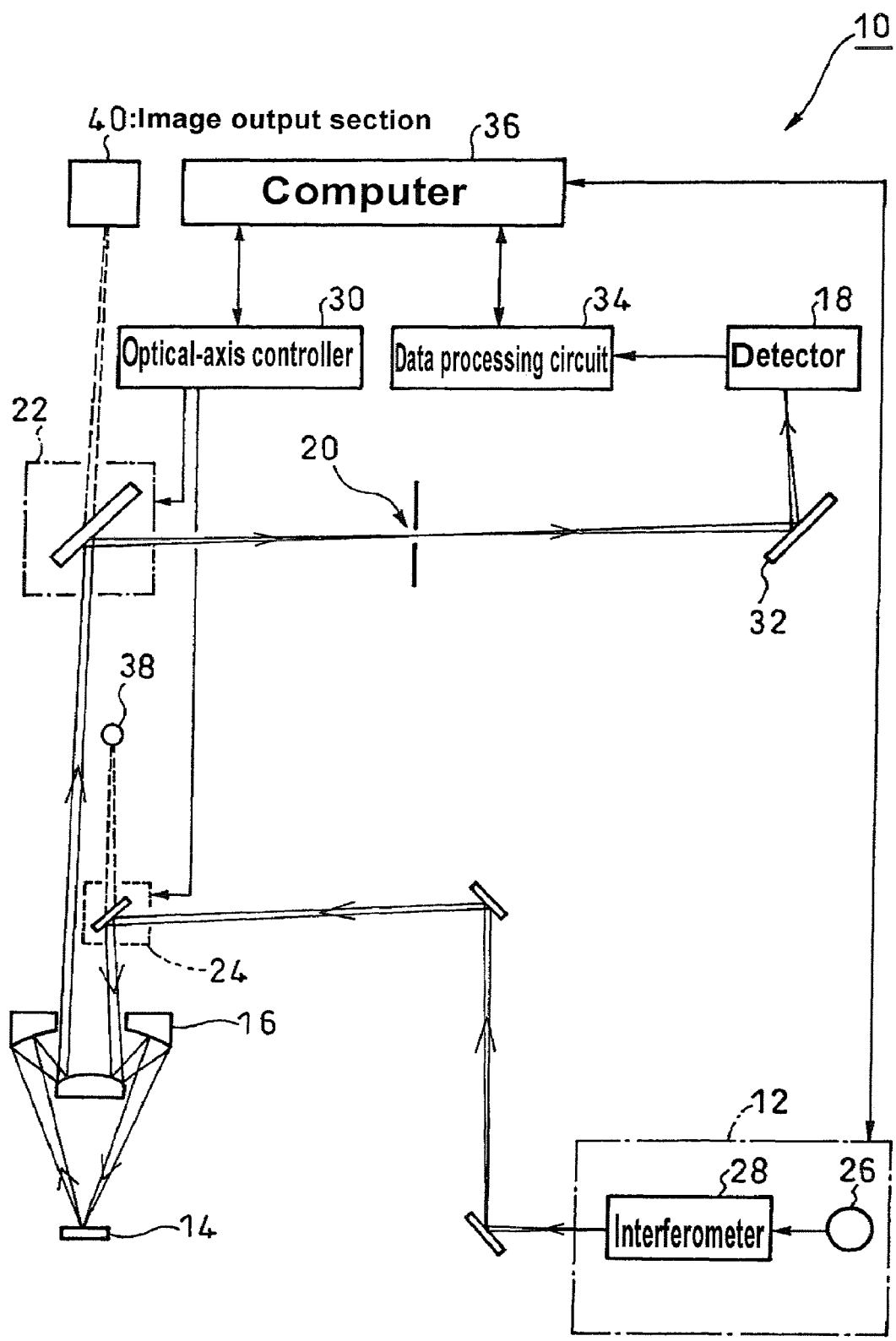
FIG. 1 is an outline structural view of a microscopic-measurement apparatus according to the present invention.

Preferred embodiments of the present invention will be described below by referring to the drawings.

FIG. 1 is an outline structural view of a microscopic-measurement apparatus according to an embodiment of the present invention.

The microscopic-measurement apparatus shown in FIG. 1 is applied to a Fourier transform infrared microspectrometer 10.

In the embodiment, as a measurement optical system, the infrared spectrometer 10 includes a light irradiation section 12, a Cassegrain objective lens 16 for focusing light on a surface to be measured of a sample 14 and collecting reflected light from the surface to be measured, a detector 18 for detecting the reflected light, an aperture 20 for restricting light directing towards the detector 18 to light coming from a specific area of the surface to be measured, a detection-side scanning mirror 22 provided in an optical path from the sample 14 to the aperture 20, and an irradiation-side scanning mirror 24 provided in an optical path from the light irradiation section 12 to the sample 14. The detection-side scanning mirror 22 and the irradiation-side scanning mirror 24 are included in an optical-axis moving section for moving an optical axis to any desired positions within a visual field.

The light irradiation section 12 includes an infrared light source 26 and an interferometer 28. Light coming from the infrared light source 26 is interfered by the interferometer 28 to form an interference light beam which is directed towards the irradiation-side scanning mirror 24. Then, the interference light beam is reflected by the irradiation-side scanning mirror 24 and directed towards the objective lens 16, and the sample 14 is irradiated with the light from the objective lens 16. At this moment, a position of irradiated area on the sample 14 is adjusted by controlling a direction of a reflection plane of the irradiation-side scanning mirror 24 with an optical-axis controller 30. Reflected light from the sample 14 is collected by the objective lens 16 and directed towards the detection-side scanning mirror 22. A direction of the detection-side scanning mirror 22 is adjusted so that only the reflected light from a specific measuring portion on the surface of the sample is directed towards an opening of the aperture 20. The aperture 20 blocks reflected light coming from any portion other than the measuring portion, and thus passes only the light coming from the measuring portion. Light passing through the aperture 20 is collected by a collecting mirror 32 and detected by the detector 18. The detected data is processed in a data processing circuit 34 and stored and processed in a computer 36. Two-dimensional mapping measurement on the surface of the sample is conducted by changing directions of the reflection planes of the irradiation-side scanning mirror 24 and the detection-side scanning mirror 22 and repeating the above-mentioned measurement.

In the embodiment of the present invention, the infrared spectrometer 10 includes an observation optical system which is provided separately from the measurement optical system. The infrared spectrometer 10 includes a visible light source 38 and an image output section 40. Visible light from the visible light source 38 irradiates the surface of the sample 14 through the objective lens 16, and reflected light from the sample 14 is directed towards the image output section 40 through the objective lens 16. The image output section 40 in itself is used as an ocular lens for direct visual observation, or it is used for visual observation by taking images with a CCD image pickup device and displaying them on a computer monitor. Basically, this observation optical system is not affected by the above-described scanning mirrors 22 or 24, and an observation position is determined by a relative position between the sample 14 and the objective lens 16, that is, by a position of a stage, which is not shown in Figs, on which the sample 14 is placed.

Figure 2:
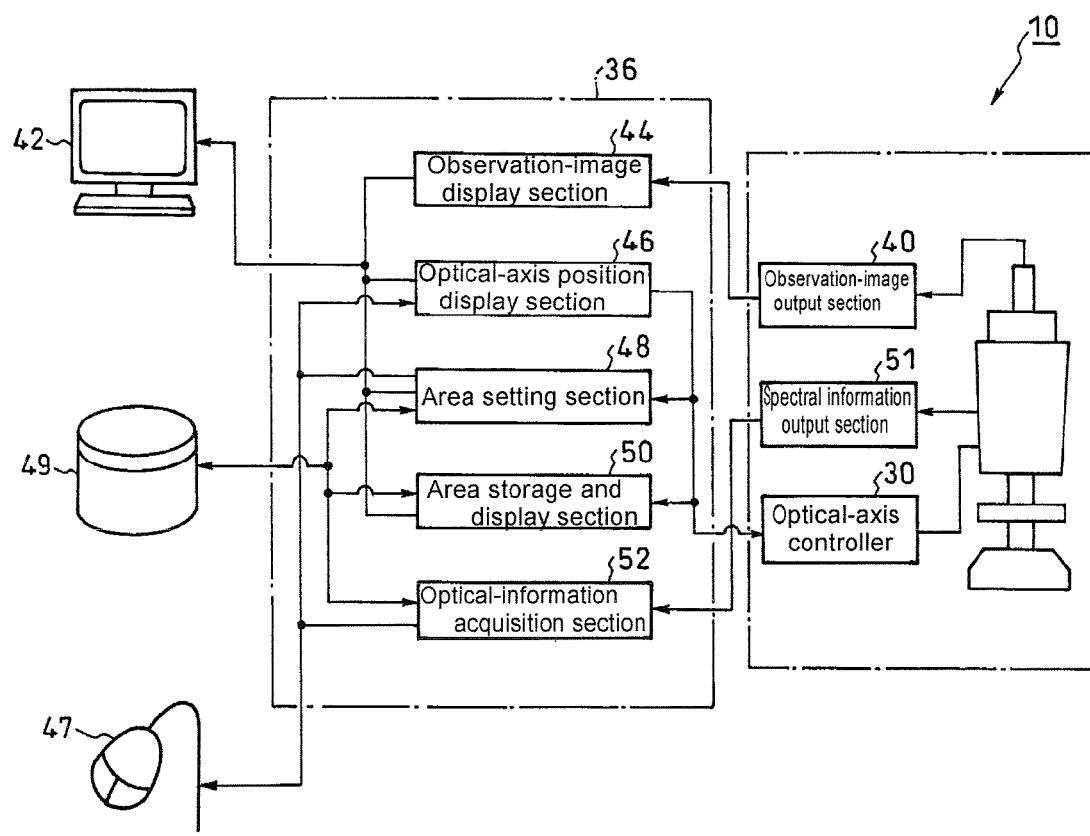
FIG. 2 is a diagram of control mechanism used in a microscopic-measurement apparatus according to the present invention.

FIG. 2 is a diagram of functions of a computer 36 preferably used in the present invention.

As showed in FIG. 2, the computer 36 includes an observation-image display section 44 for displaying an observation image which is output by the image output section 40 on a display 42, an optical-axis position display section 46 for displaying a present optical-axis position and bounding boxes which surround areas to be mapping-measured on the observation image displayed by the observation-image display section 44, an optical-information acquisition area setting section 48 that is capable of setting optical-information acquisition areas by expanding, reducing, changing in shape and moving the bounding boxes with a mouse 47 at the optical-axis position, an area storage and display section 50 for storing optical-axis position information, area information, and measuring conditions of the set measuring areas set by the area setting section 48 in a hard disc 49 and displaying such information on the observation image, and an optical-information acquisition section 52 for acquiring data from a spectral information output section 51 while conducting mapping measurement successively in several set measuring areas after completion of area setting.

Figure 3:
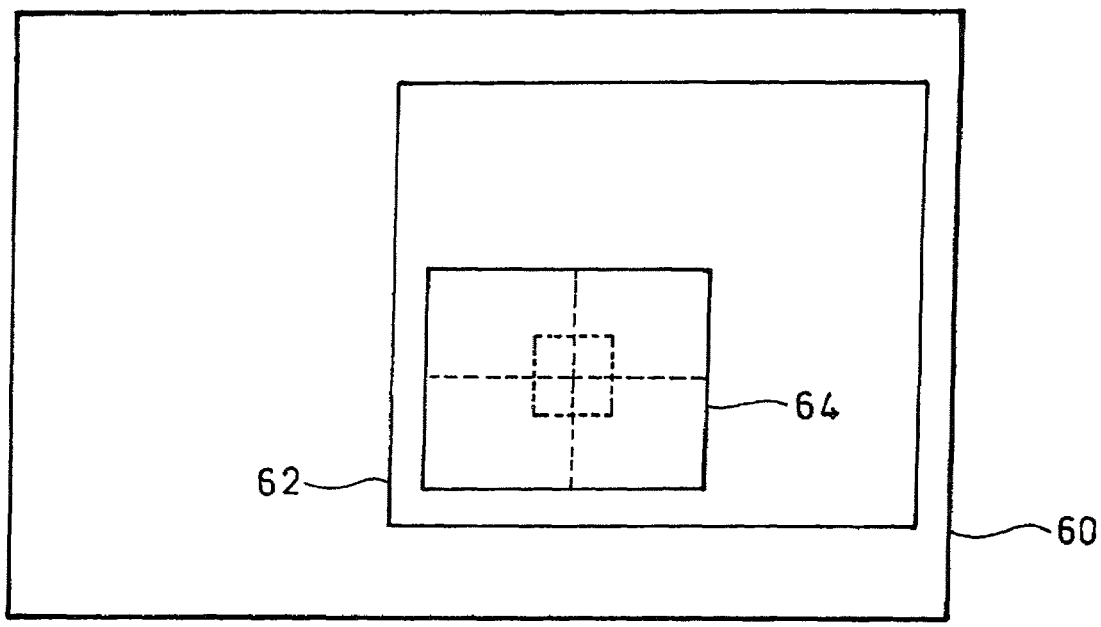
FIG. 3 is an illustrative view showing relation of a surface of a sample, a visual field area and an observation-image area in the present invention.
Figure 4:
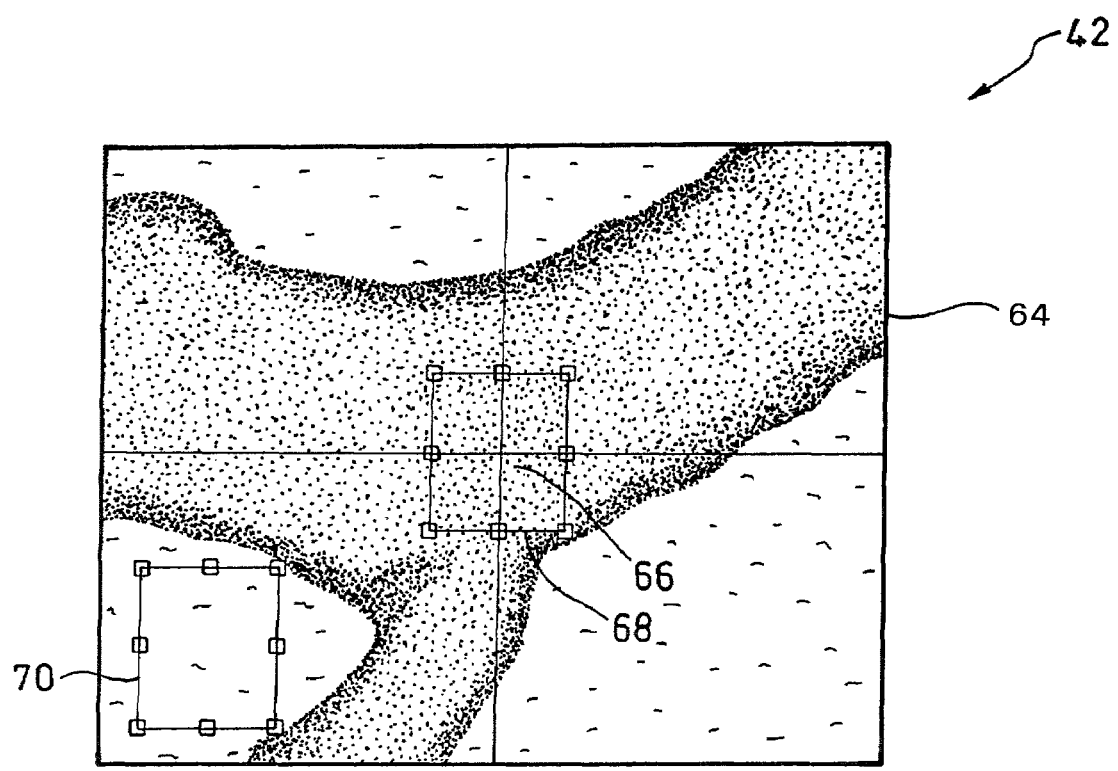
FIG. 4 is an illustrative view showing a display example on a display of a microscopic-measurement apparatus according to the present invention.

As showed in FIG. 3, a visual field area 62 as a maximum area, which is observable by moving the optical axis at a predetermined stage position, is set within a range of a surface of the sample 60 which is too broad to be observed by a microscope. Then, an observation-image area 64 which is observable at the present optical-axis position is set within the visual field area 62. FIG. 4 shows a display example of an observation image on the display 42. As is clear from FIG. 4, the observation image 64 is displayed on the display 42 on a grand scale, and a present optical-axis position 66 and an area to be mapping-measured 68 are displayed on the observation image 64. The rectangular area to be mapping-measured 68 can be expanded, reduced and changed in shape by dragging a desired point of a bounding box with the mouse 47. A previously-set measuring area 70 is also displayed on the same display as far as it can be displayed on the observation image 64. Thus, it is possible to confirm the set positions easily.

After completion of setting all optical-information acquisition areas 70 on the observation image, with an instruction of starting measurements, the optical-information acquisition section 52 moves the optical axis to one of the set measuring areas and conducts mapping measurement thereof. Every set measuring area is successively mapping-measured by repeating the operation that the optical-information acquisition section 52 moves the optical axis to one set area and conducts mapping measurement thereof.

According to the present invention, as described above, it is possible to conduct mapping measurement successively in several areas on one visual field area and conduct time-consuming mapping measurement at a single time.

According to the present invention, when the apparatus is applied to a microscope, a stage of the microscope is not required to be interlocked with change of measuring areas because measuring areas set at one time are restricted within one visual field area. Thus, it is possible to apply this invention to a microscope with a manual stage.

In the present invention, even when the apparatus is applied to a microscope using an automatic stage, moving the stage only when moving between visual field areas and moving the optical axis within each visual field area by an optical-axis controller, can prevent error accumulations owing to frequent movement of the stage.

In the embodiment, the example for conducting mapping measurement is described, however, the present invention is not limited by the example. It is also possible to apply the present invention to the case for acquiring one set of data in one area.

What is claimed is:

1. A microscopic-measurement apparatus for acquiring optical information from desired portions of a sample by moving a measuring optical axis on a surface of the sample, comprising:

an observation-image display section for displaying a sample surface image as an observation image, in a range of visual field which is observable at a present sample position;

an optical-axis display section for displaying areas to be measured and a present position of the measuring optical axis in an overlapped state with the observation image;

an area setting section capable of setting measuring areas by performing an action to the areas to be measured, selected from the group consisting of expanding, reducing, changing in shape and moving, and combinations thereof; and an optical-information acquisition section for measuring one set measuring area or several set measuring areas successively with an instruction to start measuring.

2. A microscopic-measurement apparatus according to claim 1, wherein the apparatus includes an area memory and display section for storing information about several set measuring areas and displaying set measuring areas which are displayed on the present observation image.

3. A microscopic-measurement apparatus according to claim 1, wherein the areas to be measured are areas to be mapping-measured in which mapping measurement is conducted within the areas, and the set measuring areas are set mapping-measuring areas.

4. The optical measurement apparatus according to claim 1, wherein the observation-image display section has an observation optical system to observe a surface of a sample visually, wherein the observation-image display section fixes an observation optical axis of the observation optical system on the surface of the sample, and wherein the observation-image display section displays a sample surface image as an observation image in a range of visual field which is observable with the fixed observation optical axis.

5. The optical measurement apparatus according to claim 2, wherein the observation-image display section has an observation optical system to observe a surface of a sample visually, wherein the observation-image display section fixes an observation optical axis of the observation optical system on the surface of the sample, and wherein the observation-image display section displays a sample surface image as an observation image in a range of visual field which is observable with the fixed observation optical axis.

6. The optical measurement apparatus according to claim 3, wherein the observation-image display section has an observation optical system to observe a surface of a sample visually, wherein the observation-image display section fixes an observation optical axis of the observation optical system on the surface of the sample, and wherein the observation-image display section displays a sample surface image as an observation image in a range of visual field which is observable with the fixed observation optical axis.

* * * * *